(12) United States Patent
Hayasaka et al.

(10) Patent No.: US 7,762,083 B2
(45) Date of Patent: Jul. 27, 2010

(54) GAS TURBINE PLANT AND GAS TURBINE POWER GENERATOR PLANT

(75) Inventors: Yasushi Hayasaka, Mito (JP); Masaru Sekihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 10/989,544

(22) Filed: Nov. 17, 2004

(65) Prior Publication Data

US 2005/0193738 A1    Sep. 8, 2005

(30) Foreign Application Priority Data

Nov. 19, 2003    (JP) .............................. 2003-389157

(51) Int. Cl.
*F02C 6/04*    (2006.01)
(52) U.S. Cl. .............................. 60/785; 60/804; 60/806; 415/177; 415/178; 415/180
(58) Field of Classification Search .................... 60/785, 60/804, 806; 415/177, 178, 180
See application file for complete search history.

(56) References Cited

U.S. PATENT DOCUMENTS

| | | | |
|---|---|---|---|
| 2,945,349 A | * | 7/1960 | Ritzi ............................. 60/804 |
| 3,115,011 A | * | 12/1963 | Deinhardt et al. ............. 60/804 |
| 5,074,111 A | * | 12/1991 | Harris et al. ................ 60/39.37 |
| 5,161,945 A | * | 11/1992 | Clevenger et al. ............ 415/177 |

FOREIGN PATENT DOCUMENTS

| | | |
|---|---|---|
| JP | 2-271033 A | 11/1990 |
| JP | 7-119477 A | 5/1995 |
| JP | 7-180563 A | 7/1995 |
| JP | 11-62624 A | 3/1999 |
| JP | 2001-342849 | 12/2001 |
| JP | 2003-278505 A | 10/2003 |

OTHER PUBLICATIONS

Japanese Office Action dated Feb. 12, 2008 w/English translation (fifteen (15) pages).
English translation of JP 11-62624 A, which was previously submitted with Information Disclosure Statement on May 12, 2008.

* cited by examiner

*Primary Examiner*—Michael Cuff
*Assistant Examiner*—Craig Kim
(74) *Attorney, Agent, or Firm*—Crowell & Moring LLP

(57) ABSTRACT

In a gas turbine plant and a gas turbine power generator plant, as a device of reducing the heat transfer from the gas turbine to the compressor, for instance, an air flow path for circulating part of compressed air from the compressor toward the gas turbine is formed between the gas turbine and the compressor. With the air flow path, which is a heat transfer reducing device, the heat conducted from the gas turbine to the compressor can be reduced by cooling or interception, and accordingly the temperature on the compressor side does not rise high, making it possible to prevent the performance of the compressor from deteriorating.

8 Claims, 7 Drawing Sheets

GAS TURBINE PLANT AND GAS TURBINE POWER GENERATOR PLANT

BACKGROUND OF THE INVENTION

1. Field of the Invention

The present invention relates to a gas turbine plant, and more particularly to a gas turbine plant and a gas turbine power generator plant in which a gas turbine and a compressor are disposed close to each other.

2. Description of the Related Art

In a gas turbine plant in which a gas turbine and a compressor are disposed close to each other, usually the heat of the gas turbine is discharged to a position away from the compressor by using heat pipes as disclosed in JP-A-2001-342849, for instance, so that the compressor may not be overheated by the gas from the gas turbine.

According to the prior art using heat pipes, the heat conducted from the gas turbine, as it is discharged to a position away from the compressor, does not reach the compressor. However, since many heat pipes have to be installed to the position away from the compressor in a limited space according to this prior art, the structure is complicated, involving a problem of requiring much labor for assembling work.

BRIEF SUMMARY OF THE INVENTION

An object of the present invention is to provide a gas turbine plant and a gas turbine power generator plant which allow the heat transfer from the gas turbine to the compressor reducing in a simple configuration.

In order to achieve the object stated above, heat transfer reducing means is configured by forming between a gas turbine and a compressor, for instance, an air passage for causing part of compressed air from the compressor to circulate toward the gas turbine.

Since the heat transferred from the gas turbine toward the compressor is reduced by cooling or interruption by heat transfer reducing means in such a simple configuration of forming the air passage, which is the heat transfer reducing means, heat on the compressor side does not rise to a high temperature, and accordingly the performance of the compressor can be prevented from deterioration.

According to the invention, as described above, it is possible to obtain a gas turbine plant and a gas turbine power generator plant which can reduce heat transfer from the gas turbine to the compressor in a simple configuration.

Other object, features and advantages of the invention will become apparent from the following description of the embodiments of the invention taken in conjunction with the accompanying drawings.

DETAILED DESCRIPTION OF THE INVENTION

Figure 1:
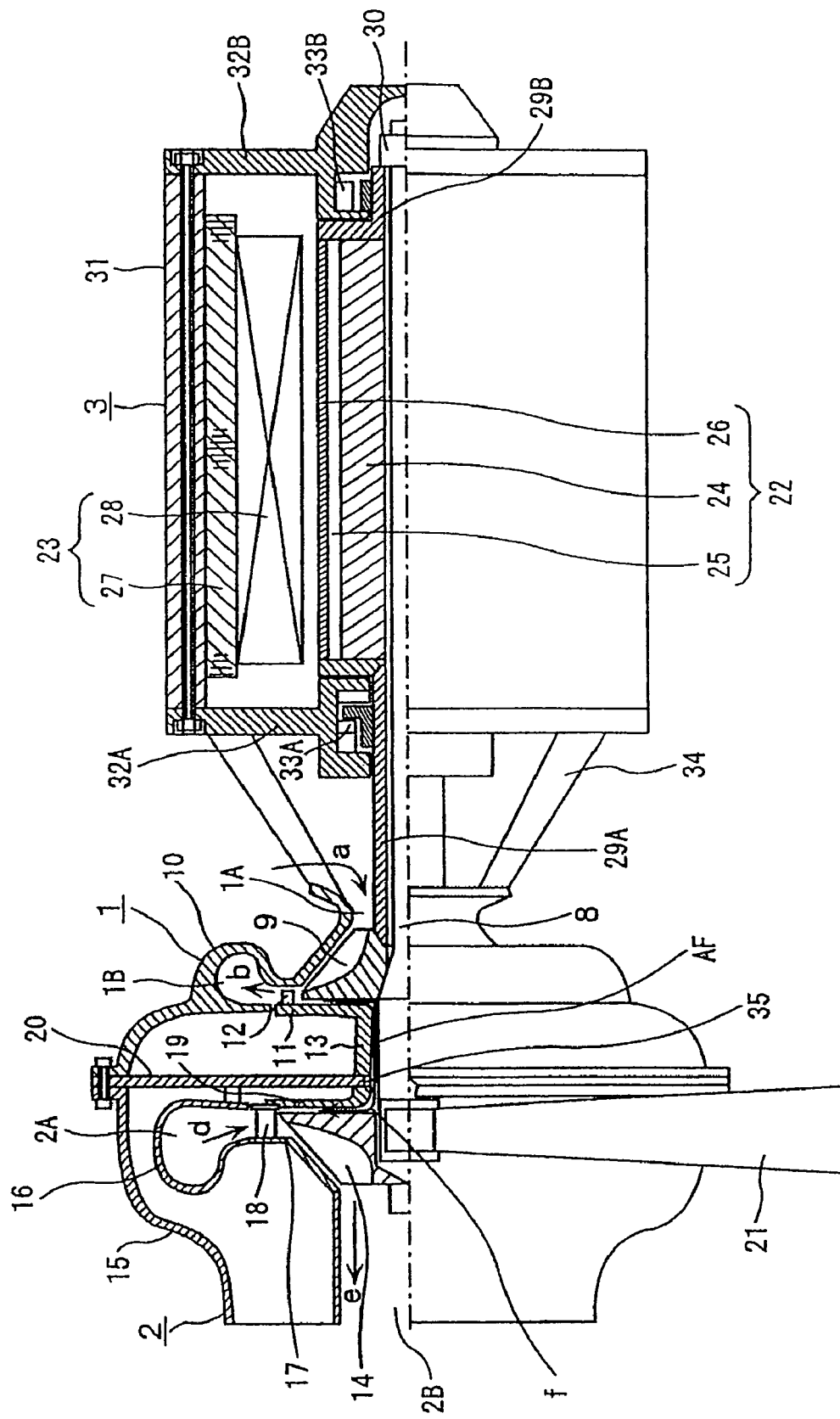
FIG. 1 is a side view, partly in cross section, showing a first embodiment of a gas turbine power generator plant according to the present invention.

The first embodiment according to the present invention will be described below with reference to a gas turbine power generator plant shown in FIG. 1 and FIG. 2.

The gas turbine power generator plant in this embodiment has, in broad terms, a compressor 1, a gas turbine 2 and a generator 3 provided coaxially. As shown in FIG. 2, air a fed to the compressor 1 is turned into compressed air b, which passes a regenerative heat exchanger (recuperator) 4 to be raised in temperature, and air c raised in temperature is mixed in a combustor 5 with fuel, which is fed by a fuel feed device not shown, to undergo combustion. Combustion gas d from the combustor 5 is supplied to the gas turbine 2 to drive the gas turbine 2, and combustion exhaust gas e is discharged after the compressed air b is raised in temperature by the regenerative heat exchanger 4. The configuration is such that the driving of the gas turbine 2 causes electric power to be generated in the generator 3 and this electric power is supplied to loads, not shown, via a rectifier 6 and an inverter 7.

The compressor 1 is a centrifugal compressor having compressor blades 9 fixed to a tie-bolt 8 which is to serve as the rotation shaft, a compressor casing 10 covering the outer circumference of these compressor blades 9 and forming an air intake port 1A on the inner diameter side and an air discharge port 1B on the outer diameter side, and a compressor diffuser 11 covering the compressor blades 9 on the opposite side to the air intake port 1A and provided with current blades 12 in positions facing the outer circumference of the compressor blades 9. On the inner diameter side, the compressor diffuser 11 has a cylinder portion 13 facing the circumferential face of the tie-bolt 8 with a minute gap between them and extending toward the gas turbine 2.

To add, the compressor blades 9 are manufactured of, for instance, a titanium alloy, an aluminum alloy or the like by precision casting, forging or machining.

The gas turbine 2 is a radial-flow turbine having turbine blades 14 fixed to an end of the tie-bolt 8, an extra-turbine casing 15 covering the whole including these turbine blades 14, an intra-turbine casing 16 forming a fuel gas inlet portion 2A on the outer diameter side of the turbine blades 14 in this extra-turbine casing 15 and forming a combustion gas exhaust portion 2B on the inner diameter side, a turbine nozzle 17 provided with nozzle blades 18 in a position opposite the outer circumference of the turbine blades 14 of this intra-turbine casing 16, and a support 19 for supporting this turbine nozzle 17.

Incidentally, as the turbine blades 14 are exposed to high-temperature combustion gas, they are usually manufactured of a nickel-based superalloy, by precision casting, forging or machining.

The support 19 so extends on the inner diameter side as to face the circumferential face of the tie-bolt 8 with a minute gap between them, and its extended end is faced to the cylinder portion 13 of the compressor diffuser 11. The extended end of the support 19 toward the inner diameter side and the cylinder portion 13 of the compressor diffuser 11 are supported by a supporting member 20, and at the outer diameter side, this supporting member 20 is linked to the compressor casing 10 and the extra-turbine casing 15.

In this way, an air flow path AF is formed of the gap between the rear face of the compressor blades 9 and the compressor diffuser 11, the gap between the cylinder portion 13 of the compressor diffuser 11 and the circumferential face of a tie-rod 8, the gap between the support 19 and the circumferential face of the tie-rod 8, and the gap between the support 19 and the rear face of the turbine blades 14, from the outer circumference side of the compressor blades 9 to the outer circumference side of the turbine blades 14 by the compressor diffuser 11 and the support 19.

The extra-turbine casing 15 to which the compressor casing 10 is linked via the supporting member 20 is supported on the installation base by a supporting pedestal 21.

The generator 3 is composed of a rotor 22 coaxial with the tie-bolt 8 and a stator 23 facing to this rotor 22 with a gap in the radial direction between them.

The rotor 22 is provided with a rotor core 24 whose central part is penetrated by the tie-bolt 8, a plurality of permanent magnets 25 arranged around the outer circumference of this rotor core 24 in the circumferential direction, and a tight binding 26 formed of a non-magnetic material, such as a non-magnetic metal ring or a fiber-reinforced plastic, to so bind these permanent magnets 25 as to press them toward the rotor core 24.

The stator 23 has a stator core 27 coaxial with the rotor core 24 and a stator coil 28 wound around this stator core 27.

The rotor 22 is fixed, with shaft collars 29A and 29B arranged on its both sides, by fastening a nut 30 on the tie-bolt 8 together with the compressor blades 9. The stator 23 is fixed to the inside of a cylindrical generator casing 31, and both ends of this generator casing 31 are blocked by end brackets 32A and 32B, respectively. Between the inner diameter side of these end brackets 32A and 32B and the shaft collars 29A and 29B respectively intervene bearings 33A and 33B. The bearing 33A is a bearing to bear loads in both radial and axial directions, and the bearing 33B is a bearing to bear a load in the radial direction.

The generator 3 of the configuration described above is prevented from letting the stator 23 turn by linking a strut 34, extending from the compressor casing 10, to the end bracket 32A.

Figure 2:
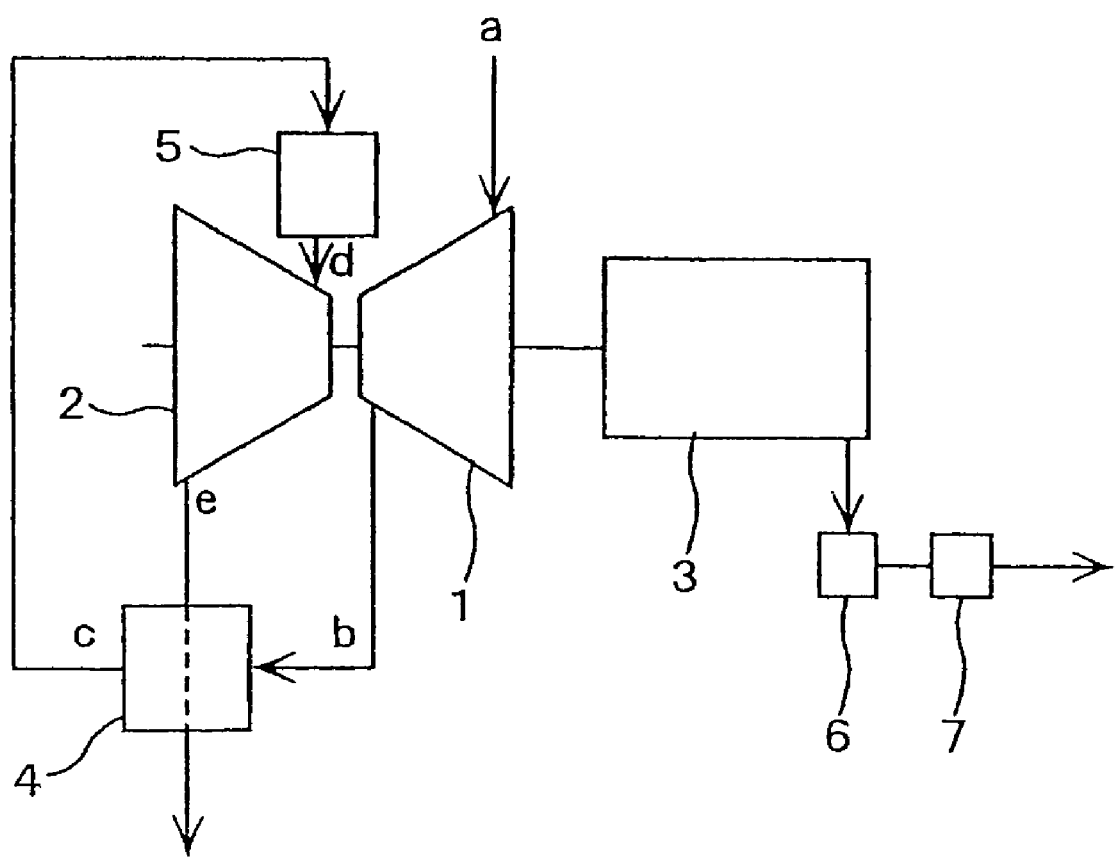
FIG. 2 is a block diagram of the gas turbine power generator plant in FIG. 1.

When the gas turbine power generator plant configured above is to be operated, air a fed to the air intake port 1A of the compressor 1 is compressed by the compressor blades 9; the compressed air b enters through the air discharge port 1B into the regenerative heat exchanger 4 shown in FIG. 2, and raised in temperature by passing therethrough; and the air c raised in temperature is mixed with fuel in the combustor 5 to be combusted. Combustion gas d generated by the combustor 5 is fed through the fuel gas inlet portion 2A of the gas turbine 2 to drive the turbine blades 14 and rotates the coaxial rotor 22 of the generator 3. The rotation of the rotor 22 generates electric power in the stator coil 28, and this electric power is supplied to loads via the rectifier 6 and the inverter 7. Referring to FIG. 1, combustion exhaust gas e is discharged through the combustion gas exhaust portion 2B, supplied to the regenerative heat exchanger 4, and discharged after it raises the temperature of compressed air b.

Incidentally, the turbine 2 is exposed to the high-temperature combustion gas d, and its heat could be transferred toward the compressor 1 via the support 19 and the compressor diffuser 11. However, as the simply structured air flow path AF is formed between the turbine 2 and the compressor 1, leaked air f, which is part of the air compressed by the compressor 1, is discharged toward the outer diameter side of the turbine blades 14 via the air flow path AF. As a result, the heat which would otherwise be transferred toward the compressor 1 via the support 19 and the compressor diffuser 11 is cooled off, and the heat transfer toward the compressor 1 is reduced. Therefore, the air flow path AF functions as heat transfer reducing means.

Further, the support 19 supporting the turbine blades 14 is extended toward the inner diameter side to approach the tie-bolt 8 and, as it is linked to the compressor diffuser 11 there, the heat transfer path from the turbine 2 to the compressor 1 can be detoured and elongated, which also can serve to reduce the heat transfer. In addition, as the heat transferred to the support 19 supporting the turbine blades 14 can be diffused by transferring it to the supporting member 20, a further heat transfer reducing effect can be achieved.

Moreover, as the support 19 supporting the turbine nozzle 17 is cooled by the leaked air f from the compressor 1, designing to keep the temperature of the support 19 low enough to satisfy the designed durability requirement is made possible, and the reliability can be increased with the service life elongated.

Incidentally, where the cooling effect and the temperature in the vicinities of the nozzle blades 18 is to be varied by altering the quantity of leaked air f passing the air flow path AF, this variation can be easily accomplished by forming a known throttle 35, such as a labyrinth seal for instance, in the cylinder portion 13 of the compressor diffuser 11, the support 19 or the supporting member 20.

Next will be described a second embodiment of a gas turbine power generator plant according to the invention in with reference to FIG. 3. Incidentally, in FIG. 3, the same references signs as in FIG. 1 and FIG. 2 denote the same objects, and the repetition of their detailed description will be dispensed with.

In this embodiment, an end of the extra-turbine casing 15 on the compressor 1 side is extended toward the inner diameter side to form a casing extended part 36, and the compressor diffuser 11 and the support 19 supporting the turbine nozzle 17 are linked to it on the inner diameter side.

To describe it in more specific terms, the casing extended part 36 of the extra-turbine casing 15 is extended farther than the outer circumferential part of the turbine blades 14 toward the inner diameter side, is linked to the inner diameter side end of the compressor diffuser 11 on this inner diameter side, and is also linked to the inner diameter side end of the support 19. Then, the compressor casing 10 and the compressor diffuser 11 are brought close to this casing extended part 36, and a thermal insulating layer 37 is disposed between them. This thermal insulating layer 37 may be provided by either having a thermally insulating material intervene or forming an air layer. Further, between the turbine nozzle 17 and the support 19, there intervenes a low thermal conductor 38 of ceramics or mica, for instance.

Also, a flow sleeve 39 to circulate the air c raised in temperature by passing the regenerative heat exchanger 4 is disposed in the vicinity of the whole inner face of the extra-turbine casing 15.

In this embodiment, as in the first embodiment, since the air flow path AF is formed of the gap between the rear face of the compressor blades 9 and the compressor diffuser 11, the gap between the cylinder portion 13 of the compressor diffuser 11 and the circumferential face of the tie-rod 8, the gap on the inner diameter side of the support 19, and the gap between the support 19 and the rear face of the turbine blades 14 from the outer circumference side of the compressor blades 9 to the outer circumference side of the turbine blades 14, the heat transfer toward the compressor 1 is restrained by the cooling effect of leaked air f. To add, as in the first embodiment, the quantity of the leaked air f passing the air flow path AF can be varied by disposing a labyrinth seal 45 or the like in the casing extended part 36.

Also, as the support 19 supporting the turbine nozzle 17 is extended toward the inner diameter side and is linked there to the casing extended part 36 to which the compressor diffuser 11 is linked, the heat transfer path from the turbine 2 to the compressor 1 can be detoured and elongated, which also can serve to reduce the heat transfer, as in the first embodiment.

Furthermore, since the heat transferred from the extra-turbine casing 15 to the compressor casing 10 is restrained by the thermal insulating layer 37 and the heat transferred from the turbine nozzle 17 to the support 19 is restrained by the low thermal conductor 38, the heat quantity which the compressor 1 receives from the gas turbine 2 can be reduced.

In addition, as air c which is lower in temperature than combustion gas d is caused to circulate in the flow sleeve 39, the temperature of the extra-turbine casing 15 can be prevented from rising, so as to make the temperature gradient to be gradual between the extra-turbine casing 15 and the compressor casing 10, and to reduce the heat transfer to the compressor 1 via the extra-turbine casing 15.

Figure 3:
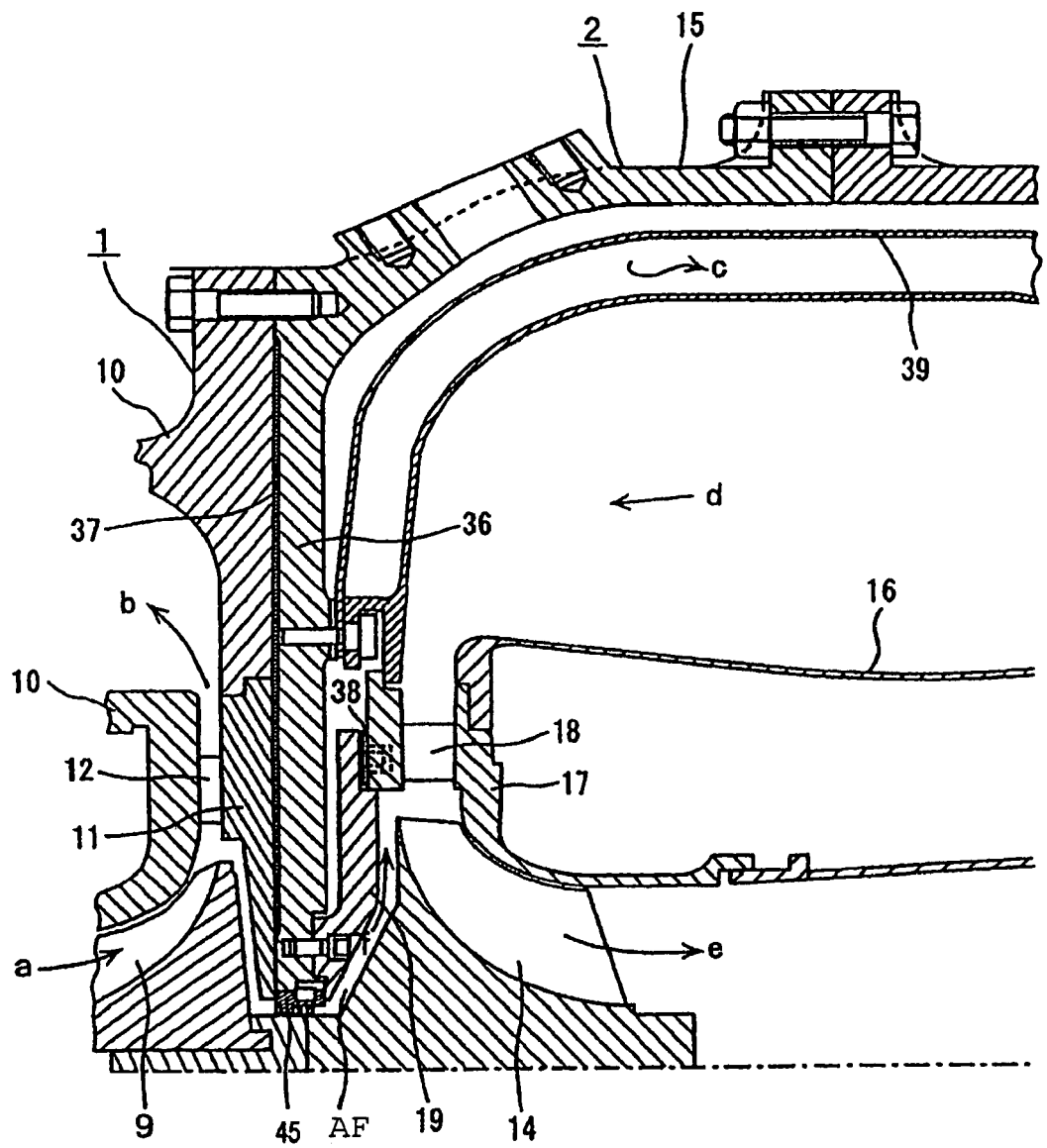
FIG. 3 is an enlarged section of the essential part showing a second embodiment of a gas turbine power generator plant according to the invention.
Figure 4:
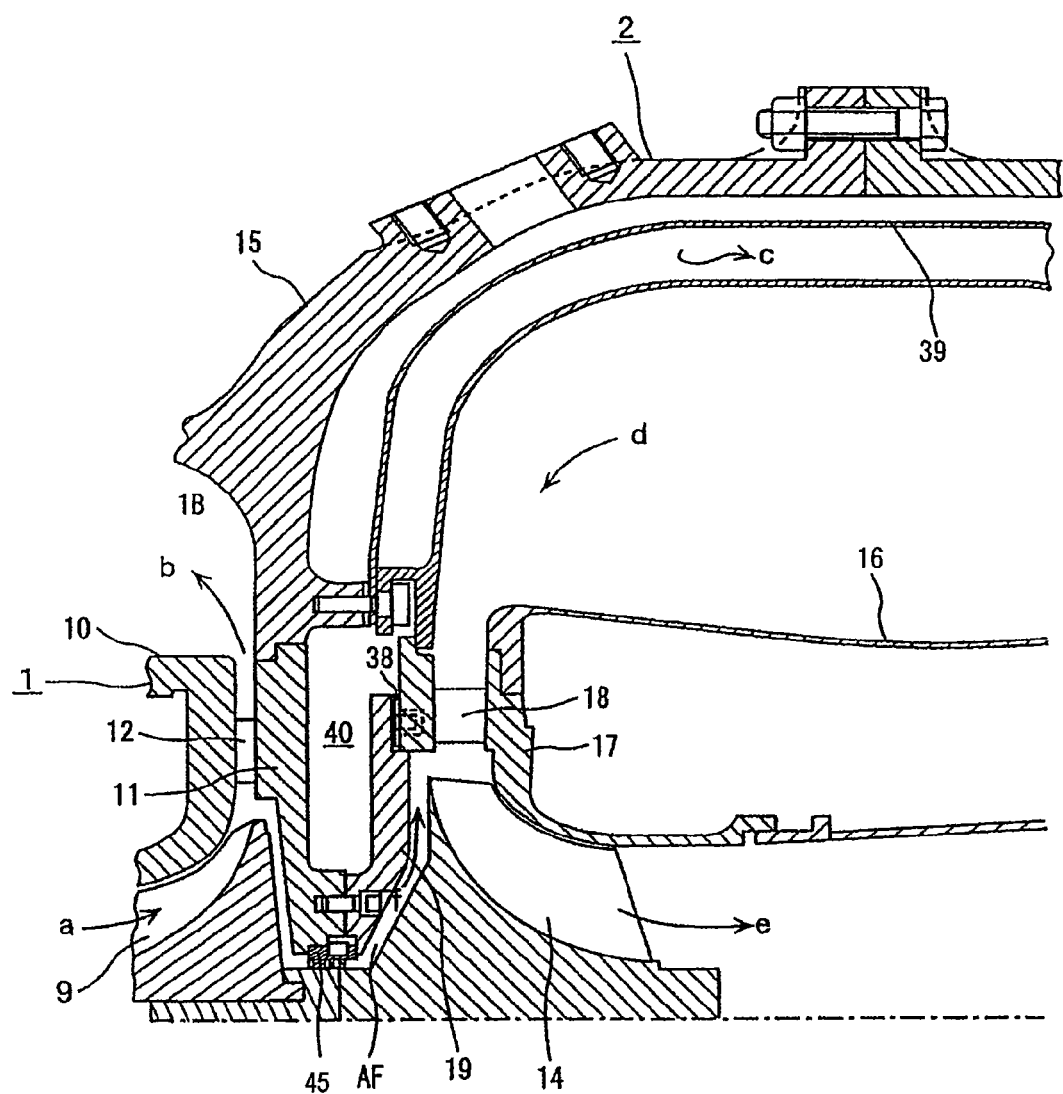
FIG. 4 is an equivalent of FIG. 3 showing a third embodiment of a gas turbine power generator plant according to the invention.

FIG. 4 shows a third embodiment according to the invention in a gas turbine power generator plant; as the same references signs as in FIG. 1 through FIG. 3 denote the same objects, the repetition of their detailed description will be dispensed with.

In this embodiment, the support 19 supporting the turbine nozzle 17 is linked to the compressor diffuser 11 supported by the extra-turbine casing 15 on the inner diameter side, and a cavity 40 is formed between the support 19 and the compressor diffuser 11, with other aspects of the configuration being the same as in the embodiment shown in FIG. 3.

With the above-described configuration, it is possible to restrain the quantity of heat conduction by the cooling effect of leaked air f circulating through the air flow path AF and detouring toward the inner diameter side the heat transfer path from the support 19 to the compressor diffuser 11, and further the radiated heat from the support 19 to the compressor diffuser 11 can be reduced by the cavity 40. Incidentally, by arranging a thermal insulator or the like in the cavity 40, an effect to further reduce the radiated heat can be achieved.

Also, a low thermal conductor of ceramics or mica, for instance, may intervene in the linking part between the support 19 and the compressor diffuser 11.

Next will be described a fourth embodiment of a gas turbine power generator plant according to the invention with reference to FIG. 5. This embodiment is a partial improvement over the embodiment shown in FIG. 4; as the same references signs as in FIG. 4 denote the same objects, the repetition of their detailed description will be dispensed with.

The aspect of configuration of this embodiment differing from what is shown in FIG. 4 is that a low thermal conductivity structural member 41 having a lower thermal conductivity than the compressor diffuser 11 and the support 19 is disposed on the inner diameter side of the compressor diffuser 11, and is linked to the support 19.

In the configuration described above, besides providing the same effect as the third embodiment, not only the thermal resistance which the low thermal conductivity structural member 41 has but also contact thermal resistances formed in the linking face between the support 19 and the low thermal conductivity structural member 41 and in the linking face between the low thermal conductivity structural member 41 and the compressor diffuser 11 can further restrain the quantity of heat conduction from the support 19 to the compressor diffuser 11.

Figure 5:
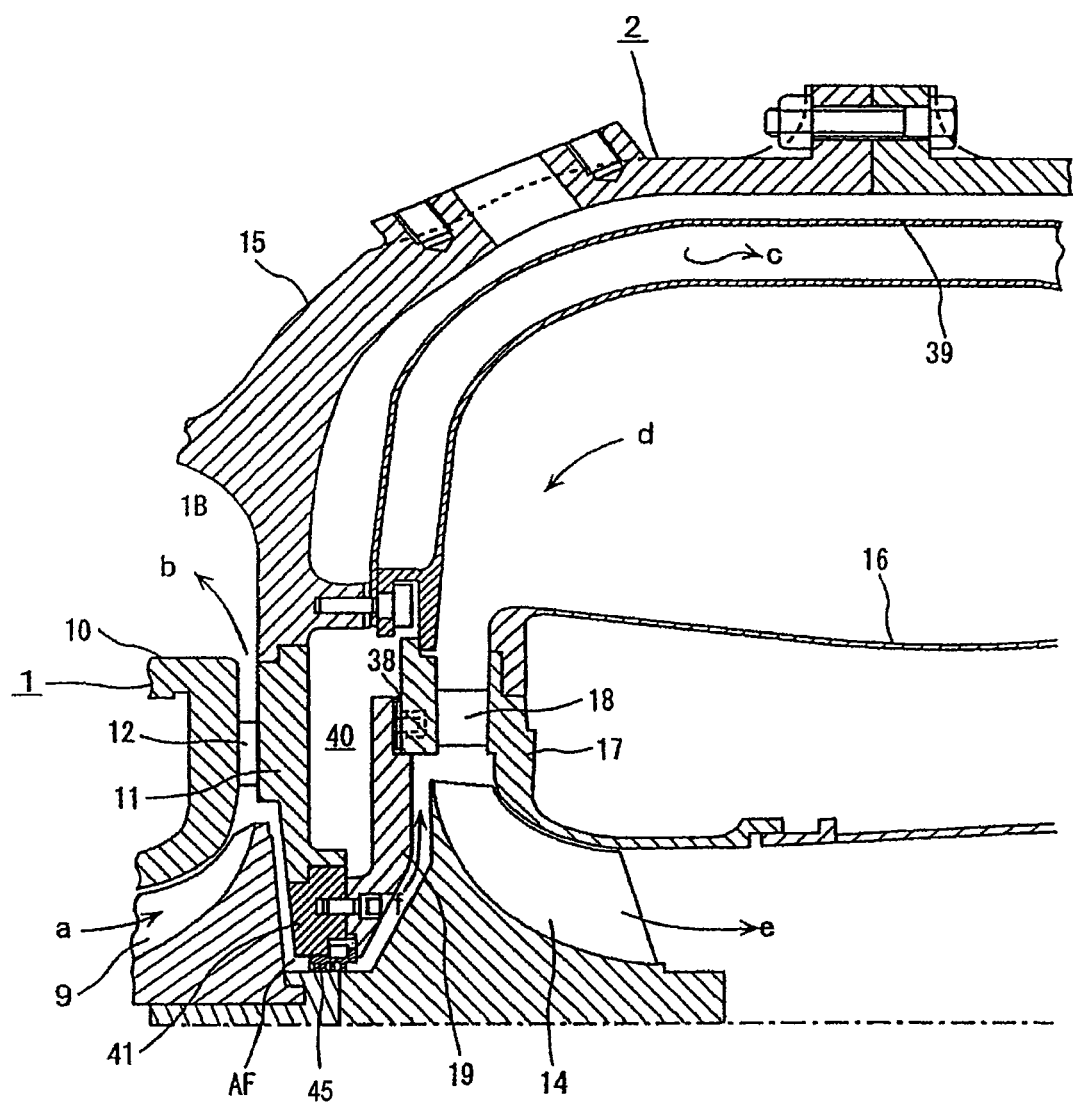
FIG. 5 is an equivalent of FIG. 3 showing a fourth embodiment of a gas turbine power generator plant according to the invention.
Figure 6:
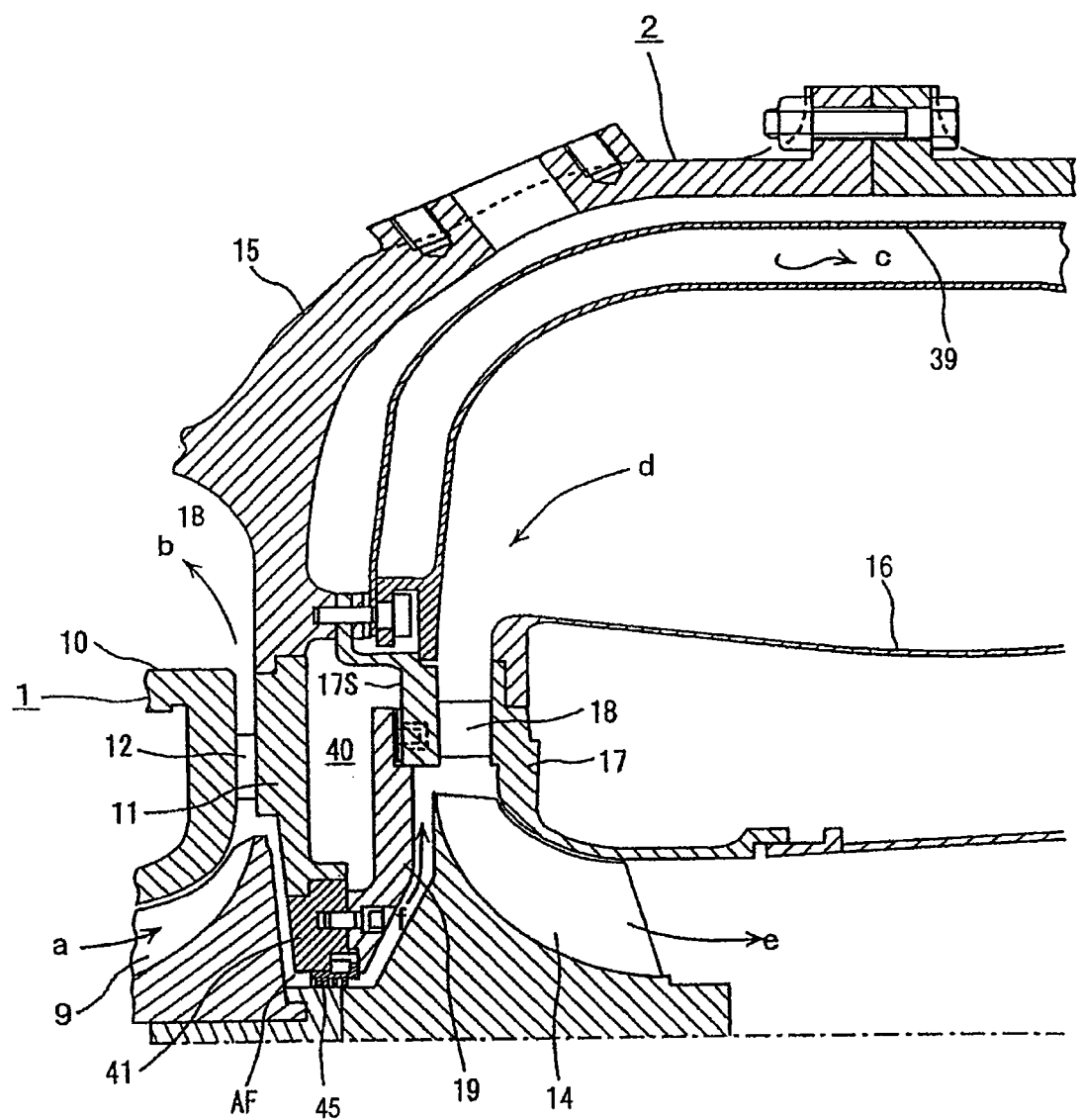
FIG. 6 is an equivalent of FIG. 3 showing a fifth embodiment of a gas turbine power generator plant according to the invention.

FIG. 6 shows a fifth embodiment of a gas turbine power generator plant according to the invention, which is a partial improvement over the embodiment shown in FIG. 5. Therefore, the same references signs as in FIG. 5 denote the same objects, and the repetition of their detailed description will be dispensed with.

In this embodiment, a fixed part 17S of the turbine nozzle 17 to the support 19 is partially extended on the outer diameter side toward the compressor 1, and that extended part is linked to the extra-turbine casing 15.

With the above-described configuration, the heat of the turbine nozzle 17 is conducted to the support 19 and partially to the air discharge port 1B of the compressor 1 via the fixed part 17S and the extra-turbine casing 15, where it is cooled by compressed air b. Therefore, the quantity of heat transmitted to the support 19 can be reduced and the heat transfer toward the compressor 1 can be restrained.

Further, by varying dimensions, such as enlarging the wall thickness of the fixed part 17S and reducing that of the support 19, the quantity of heat conducted toward the compressor 1 can be controlled.

Figure 7:
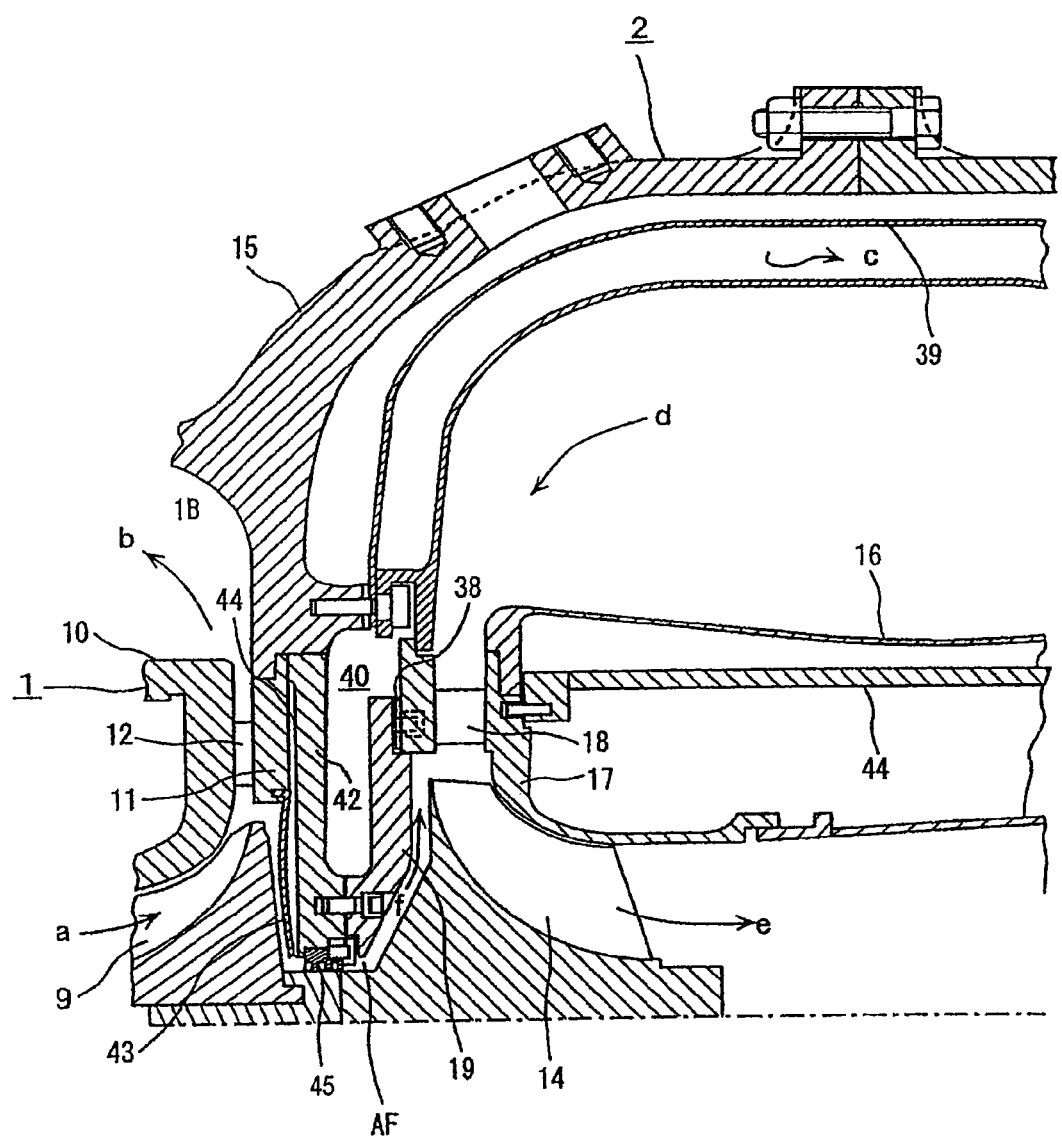
FIG. 7 is an equivalent of FIG. 3 showing a sixth embodiment of a gas turbine power generator plant according to the invention.

FIG. 7 showing a sixth embodiment of a gas turbine power generator plant according to the invention, which is a partial improvement over the embodiment shown in FIG. 4

The aspects of configuration of this embodiment differing from what is shown in FIG. 4 are that, apart from the compressor diffuser 11 supported by the extra-turbine casing 15, it is supported by a support 42, this support 42 is extended toward the inner diameter side, and to its extension end the inner diameter side end of the support 19 is linked, and that a heat intercepting plate 43 is provided between the support 42 on the inner diameter side and the compressor diffuser 11 and a heat intercepting layer 44 is formed between the compressor diffuser 11 and the support 19.

In this embodiment, the heat transmitted to the support 19 can be let escape via the support 42 and the extra-turbine casing 15 to the air discharge port 1B of the compressor 1 while restraining heat conduction from the turbine nozzle 17 toward the compressor 1 via the support 19. As a result, the performance deterioration of the compressor 1 due to heat and heat losses from the turbine nozzle 17 can be restrained.

To add, as a configurational aspect applicable to every embodiment, it is preferable, with a view to maintaining the sealing effect between the intra-turbine casing 16 and the turbine nozzle 17, to provide a nozzle support 44 and to cause the end of the intra-turbine casing 16 to be pressed, as shown in FIG. 7.

As hitherto described, in each embodiment according to the present invention, heat transmitted from the turbine 2 toward the compressor 1 can be effectively restrained by a simple structure.

It should be further understood by those skilled in the art that the foregoing description has been made on embodiments of the invention and that various changes and modifications may be made in the invention without departing from the spirit of the invention and the scope of the appended claims.

The invention claimed is:

1. A gas turbine power generator plant including a gas turbine, a compressor and a generator on a common axis, in which said gas turbine and said compressor are arranged close to each other, said gas turbine is provided with a turbine nozzle in a position facing turbine blades on an outer circumferential side thereof, said compressor has a compressor diffuser provided with current blades in positions facing an outer circumference of compressor blades, and said turbine nozzle is fixed to a fixed member, wherein a heat transfer reducing arrangement is disposed between said fixed member and said compressor diffuser, and wherein said fixed member and said compressor diffuser are linked farther inward than the outer diameter of the turbine blades and the outer diameter of the compressor blades, further comprising an air flow path which is formed between rotating members including a rear face of the compressor blades and a rear face of the turbine blades and stationary members including said compressor diffuser and said fixed member and circulates part of compressed air from said compressor.

2. The gas turbine plant according to claim 1, wherein said heat transfer reducing arrangement is a thermal insulating layer disposed between said fixed member and said compressor diffuser.

3. The gas turbine plant according to claim 2, wherein said thermal insulating layer is a heat insulator.

4. The gas turbine plant according to claim 2, wherein said thermal insulating layer is an air chamber.

5. The gas turbine plant according to claim 1, wherein said heat transfer reducing arrangement is a constituent member made of a heat-resistant material disposed between said fixed member and said compressor diffuser.

6. The gas turbine power generator plant according to claim 1, wherein part of said turbine nozzle is fixed to an extra-turbine casing.

7. The gas turbine power generator plant according to claim 1, wherein said fixed member and said compressor diffuser are linked through a casing extended part formed by extending an end of the extra-turbine casing on the compressor side toward an inner diameter side.

8. The gas turbine power generator plant according to claim 1, wherein said heat transfer reducing arrangement is disposed so that said compressor diffuser does not come in direct contact with said fixed member and said turbine nozzle except a connection portion of said compressor diffuser and said fixed member.

* * * * *